Patented Feb. 21, 1939

2,147,713

UNITED STATES PATENT OFFICE 2,147,713

PROCESS OF TREATING OIL

John W. Orelup, Summit, N. J.

No Drawing. Application August 17, 1932, Serial No. 629,189

4 Claims. (Cl. 87—9)

The present invention relates to improvements in the art of treating lubricating oils, with particular regard paid to improving the color of such oils. The present application is a continuation in part of my previously filed application, Serial No. 366,523 of May 27, 1929 now Patent 2,097,773 issued Nov. 2, 1937.

In order to enable one skilled in the art to practice the invention, the following illustrative example is given:

| | Parts |
|---|---|
| Alkylated acridine dye (known as Phosphine 5 G.) | 1 |
| Stearic acid | 1 |
| Aluminum stearate | 3 | are heated to 120° C. while stirring, during which time heat and gas are evolved. Heating is continued until a test sample shows no increased fluorescence. The mixture is then cooled and pulverized and formed into a 10% solution in mineral oil, preferably of the lubricating type or of a type which may be blended with lubricating oils. For coloring lubricating oil stock, one-quarter to one-half gallon of the solution is added to 100 gallons of lubricating oil whose color it is desired to improve, whereupon it is found that the undesirable bluish cast of the oil is eliminated, and a substantially permanent bright yellowish fluorescence is produced of a pleasing appearance.

As stated in my co-pending application mentioned, the function of the stabilizer and of the treatment of the dye therewith is not only to render soluble in the oil, dyes which are not normally so soluble but in the case of fluorescent colors to develop the fluorescence inherent in the dye. The Phosphine 5 G., mentioned in the foregoing example, which is soluble in mineral oil gives, however, little or no fluorescence therein without being treated in accordance with the invention.

Previously it has been sought to impart a fluorescent appearance to lubricating oils by blending them with a quantity of blooming oil prepared from residues from the petroleum industry, but this has the disadvantage of adding a quality of redness and a murkiness to the body color. In contrast, my new preparation does not add any redness or murkiness to the body color, but clears the treated oil.

Other dyestuffs may be used than the one mentioned, such for instance as the rhodamines, eosines, and eurhodines. In general these dyestuffs are insoluble in mineral oils, and so far as I am aware it has not been possible, prior to my invention, to form stable mixtures of lubricating oils and these or other insoluble dyes. Furthermore, other water non-soluble soaps may be used, as for example magnesium oleate, magnesium stearate, magnesium resinate, as well as zinc and other aluminum soaps, all of which may be described as belonging to the hydrophobe type of colloidal substances. The proportions stated in the above example are not critical and may be varied to suit conditions, and in particular the stearic acid may be reduced materially.

The heat generated in the operation of mixing the dye stabilizer and blender, as well as the evolution of gas, is evidence of a chemical reaction which takes place, but thus far I am unable to state what the exact nature of the reaction is.

I claim:

1. The method of preparing a fluorescent coloring material for lubricating oils which consists in heating together sufficiently to effect the reaction of the ingredients a water insoluble soap, a higher fatty acid and a dye belonging to any one of the following classes: acridines, rhodamines, eosines, eurhodines.

2. The method of preparing a fluorescent coloring material for lubricating oils which consists in heating together sufficiently to effect the reaction of the ingredients a water insoluble soap, a higher fatty acid and a dye belonging to any one of the following classes: acridines, rhodamines, eosines, eurhodines, and then incorporating the mixture in lubricating oil in an amount to produce the desired effect.

3. A lubricating oil containing as a fluorescent coloring material the products of a chemical reaction involving an acridine dye, stearic acid and aluminum stearate, such reaction being brought about by heating the materials sufficiently to effect a reaction evidenced by the evolution of gas.

4. A mixture according to claim 3 in which the acridine dye is of the alkylated type.

JOHN W. ORELUP.